IMBEDDED LOOP CONDUCTOR MAGNETIC MEMORY

Filed Oct. 16, 1963

2 Sheets-Sheet 1

INVENTOR.
MELVIN M. KAUFMAN
BY Carl V. Olson
Attorney

INVENTOR.
MELVIN M. KAUFMAN
BY
Carl V. Olson
Attorney

United States Patent Office 3,339,190

Patented Aug. 29, 1967

3,339,190

IMBEDDED LOOP CONDUCTOR MAGNETIC MEMORY

Melvin M. Kaufman, Levittown, N.J., assignor to Radio Corporation of America, a corporation of Delaware Filed Oct. 16, 1963, Ser. No. 316,697
3 Claims. (Cl. 340—174)

ABSTRACT OF THE DISCLOSURE

A bit-organized random-access magnetic memory consisting of a planar body of magnetic material containing information storage locations arranged in rows and columns. Each information storage location includes a conductor imbedded in the magnetic body and extending transversely therethrough from a terminal end on one surface to the opposite surface, a connection on the opposite surface, and a closely-spaced parallel return conductor extending to an end near the one surface of the magnetic body. The ends of the conductors of the information storage locations are coupled to row and column selection conductors, by means of which any one location can be accessed.

This invention relates to magnetic memories for the storage of digital information, and particularly to random-access magnetic memories of the type wherein current-carrying conductors are imbedded in a body of magnetic material, such as sintered ferrite.

It is an object of the invention to provide an improved magnetic memory element characterized in that switching of flux can be performed rapidly, and in that an improved "1" to "0" (noise) ratio results when sensing stored information.

It is another object to provide an improved array of large numbers of very small memory elements in an integrated structure made by batch fabrication techniques.

A single memory element according to the invention includes an elongated loop conductor imbedded in a body of magnetic material so that the magnetomotive forces due to the same current flowing in the ingoing and return portions of the loop conductor are additive in the magnetic material between the two portions and are subtractive elsewhere. This results in a localization of flux switching. The localized closed loop flux paths are short and they can be switched rapidly.

According to an example of the invention, an array of rows and columns of memory elements is constructed by printing conductors on layers of doctor bladed green ferrite sheets, which are then laminated to provide a homogeneous sintered ferrite magnetic body having imbedded conductors. The imbedded conductors are connected to form conductor loops each connected at one end to a corresponding row conductor bus, and each connected at the other end through two oppositely-poled diodes to respective ones of the two conductors of a corresponding column conductor pair. Each accessible memory element includes two diodes and a conductive loop imbedded in the magnetic body. The entire assembly may be of integrated construction made by batch fabrication techniques.

Figure 1:
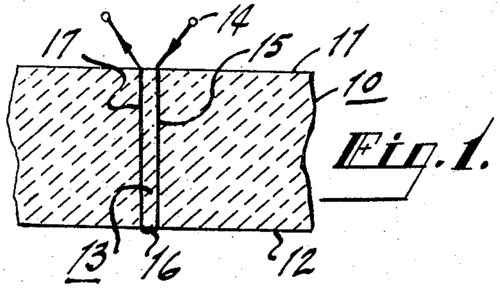
FIG. 1 is a sectional view of a memory element comprising a body of magnetic material and an imbedded loop conductor.

Referring now in greater detail to the drawing, FIG. 1 is a sectional view illustrating a memory element consisting of a body 10 of magnetic material such as sintered ferrite (which is an electrical insulator), and a conductive loop 13 imbedded in the magnetic material. The conductive loop 13 includes a terminal 14, an ingoing conductor or conductive portion 15 extending transversely between major surfaces 11 and 12 of the magnetic body 10, a connection 16, and a return conductor or conductive return path portion 17 extending in parallel closely-spaced relation with conductor 15.

When a current pulse is applied to the terminal 14 to cause a current flow in the direction indicated, the current flowing in the ingoing conductor 15 of the conductive loop is accompanied by a magnetomotive force which tends to produce flux with a direction going into the paper of the drawing in the magnetic material to the left of the conductor 15 and out of the paper in the magnetic material to the right of conductor 15. The same current flowing in the reverse direction through the return conductor 13 of the conductive loop is accompanied by a magnetomotive force which tends to produce flux going into the paper on the right of return conductor 13 and out of the paper on the left of return conductor 13. The magnetomotive forces due to the same current in the conductor 15 and the return conductor 17 are in additive directions between the conductors and are in subtractive directions elsewhere. Therefore, flux switching is substantially limited to the region between conductors 15 and 17, and to regions of comparable dimensions on both sides of the conductors. The construction is such that the flux switching due to a current pulse in the conductors 15 and 17 is limited by the spacing of the conductors and is localized in the magnetic material between and surrounding the conductors.

The electro-magnetic structure illustrated in FIG. 1 has important advantages when used as an information storage element. The limiting and localization of flux switching permits a large number of similar memory elements to be relatively close together in a magnetic body without the action of flux changes in one spreading to and adversely influencing other memory elements. The speed with which the direction of flux can be switched increases when the amplitude of the driving current pulse is increased. Pulses of large amplitude may be employed in the described arrangement without adversely affecting other memory elements sharing the same magnetic body 10.

Another advantage is that the closed loop flux paths which are switched are relatively short, the shortest of the closed loop paths around a conductor being equal to the circumference of the conductor. Since the speed with which the direction of flux can be switched depends on the length of the closed loop flux paths, the short paths permit flux to be switched very rapidly. The amplitude of a sense signal depends on the amount of flux switched. The amount of flux switched in the arrangement of FIG. 1 can be made as large as desired by increasing the thickness of the magnetic body 10 and correspondingly lengthening the conductive portions 15 and 17. The increase in the amount of flux switched is not accompanied by an increase in the lengths of the closed loop flux paths.

Figures 2, 3, 4:
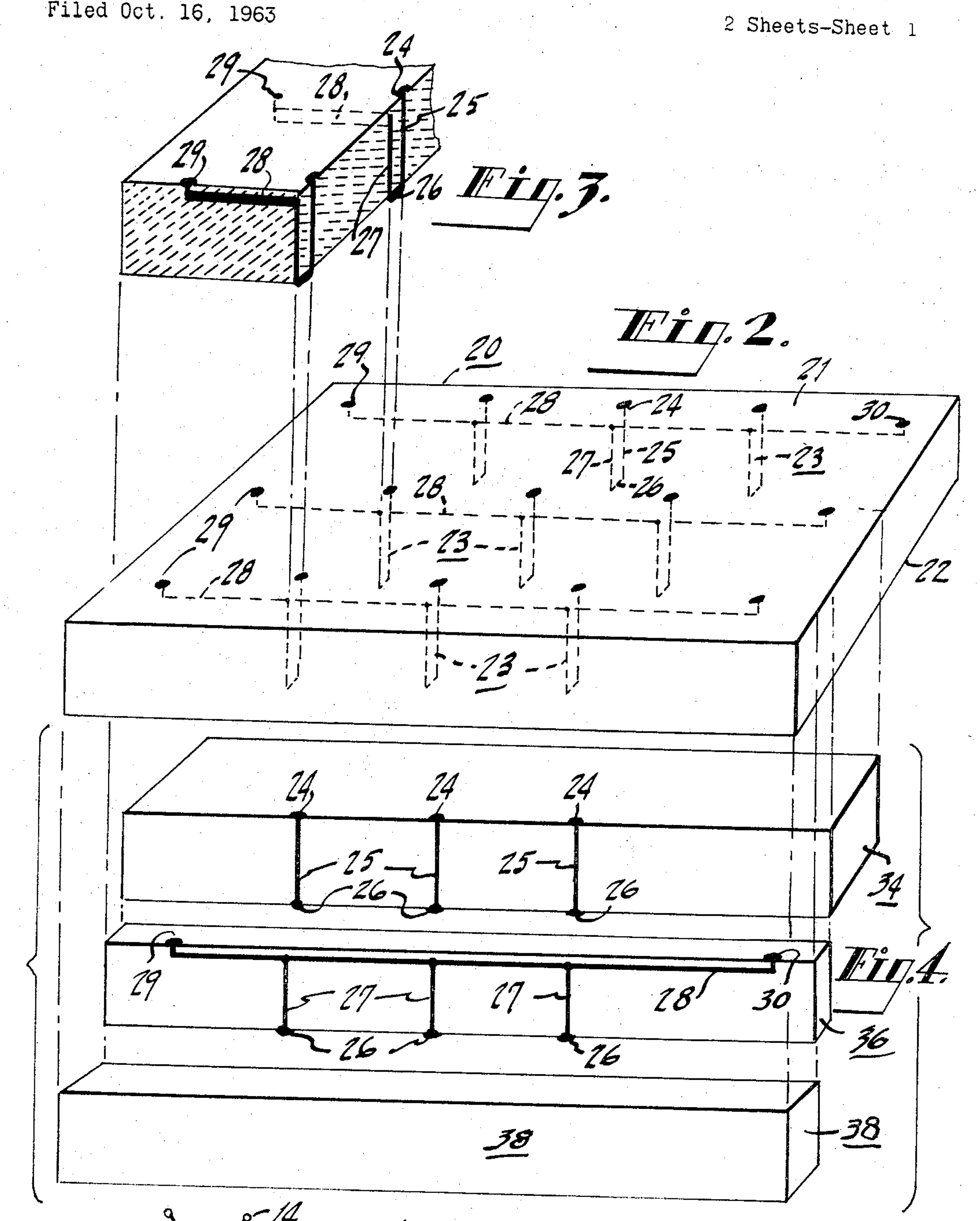
FIG. 2 is a perspective view of an array of memory elements including a body of magnetic material having imbedded conductive loops.
FIG. 3 is a projected fragmentary part of the array of FIG. 2 shown for the purpose of illustrating interior details.
FIG. 4 is a projection of layers from which the array of FIG. 2 is fabricated.

FIG. 2 shows a planar body 20 of magnetic material, such as sintered ferrite, having an array of memory elements or elemental storage locations 23 arranged in rows and columns. As shown to advantage in the fragmentary view of FIG. 3, each element 23 includes a terminal 24 on the top major surface 21 of the magnetic body, an ingoing conductor 25, a connection 26 on the bottom major surface 22 of the magnetic body 20 and a return conductor 27 extending in parallel closely-spaced relation with conductor 25 back toward the top major surface 21 of the magnetic body to a return conductor bus 28. The return conductors of a row of memory elements are all connected to a respective return conductor bus. Each return conductor bus 28 is imbedded under the top major surface 21 of the magnetic member 20 to electrically insulate it from terminals 24 and other conductors to be described. Return conductor busses 28 are preferably made sufficiently wide to suitably reduce the inductance of the current path each bus forms through the magnetic material. Each return conductor bus is provided with terminals 29 and 30 on the top major surface 21 of the magnetic body.

The memory array in FIG. 2 is preferably constructed by laminating a number of layers of magnetic material, some of which have printed conductors thereon. FIG. 4 shows separated projected layers 34, 36 and 38 of the laminated magnetic body 20 for reference in describing the preferred method of constructing the array of memory elements. Each of layers 34, 36 and 38 is initially formed by "doctor blading" a slurry of green ferrite particles on a smooth substrate. The slurry then dries to form a leather-like sheet or layer of green ferrite. The layer 34 is provided with conductors 25, and layer 36 is provided with conductors 27 and 28, in the patterns illustrated. The conductors are made of a refractory conductive metal and may be in the form of a paste including conductive particles.

The green ferrite layers 34 and 36 with their "printed" conductors, the end layer 38, and other layers not separately illustrated, are assembled in stacked registered relationship and are laminated by pressure and modest heat to form a block of green ferrite. The lamination is then subjected to a firing temperature of about 1200° C. which sinters the green ferrite into a uniform homogeneous body of ferrite 20 having imbedded conductors. The sintering is accompanied by a shrinkage of the volume of the green ferrite. The shrinkage of the ferrite compacts the conductive particles of the paste conductors and perfects an electrical continuity between the conductive particles. The doctor bladed layers can be made with great accuracy in very thin dimensions. The thickness of the layer 36 may, for example, be 0.001 inch or less. The thickness of layer 36 determines the spacing between corresponding conductors 25 and 27. The construction wherein a layer 36 of doctor bladed ferrite is interposed between corresponding conductors 25 and 27 permits a closer spacing of the conductors than can be achieved between two conductors both of which are printed side-by-side on the same surface of a ferrite layer.

The conductors 27 and 28 may be printed on the back side of the ferrite layer 38 instead of on the layer 36. This somewhat simplifies the making of the layer 36 in the very thin dimensions that are desired.

The finished sintered block of ferrite is ground smooth on its major surfaces 21 and 22, is provided on the top major surface 21 with terminals 24, 29 and 30, and is provided on the bottom major surface 22 with connections 26 between respective conductors 25 and 27.

Figure 5:
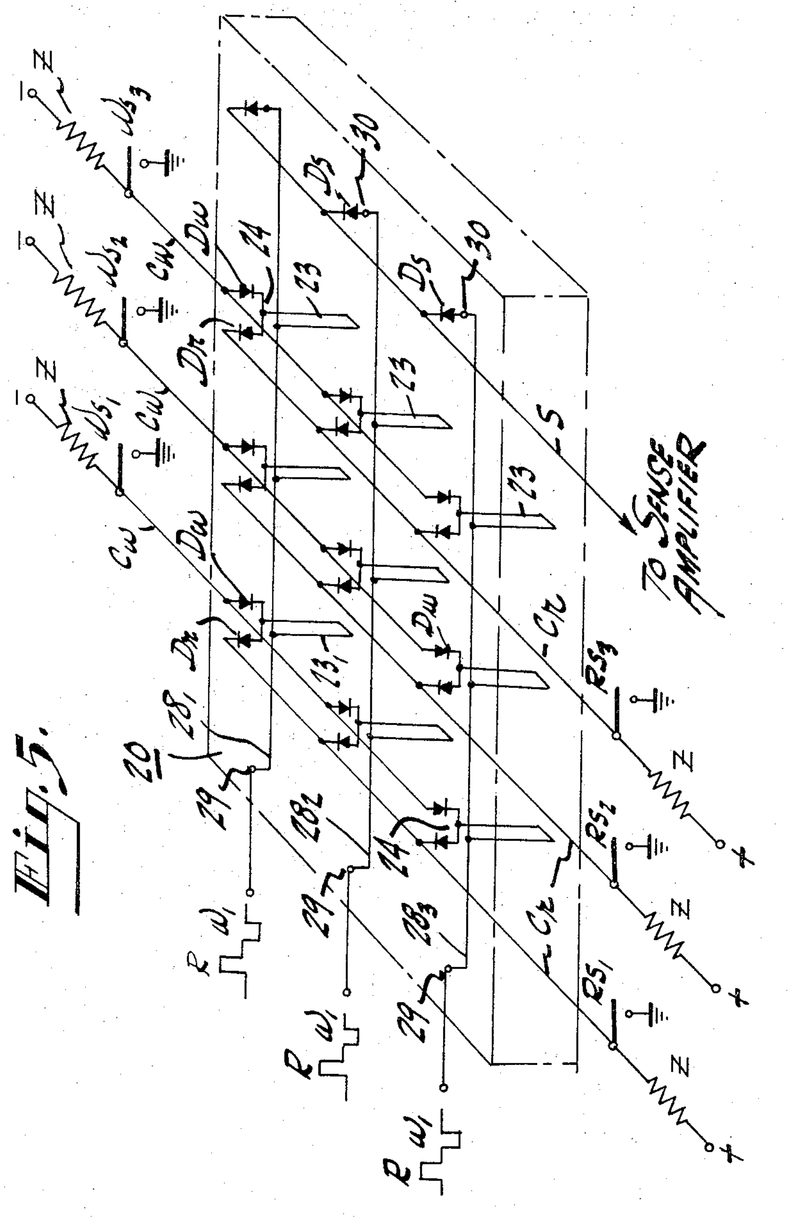
FIG. 5 is a perspective view showing the conductors of the structure of FIG. 2 together with means external of the magnetic body for randomly accessing the memory elements through row conductors, column conductors and diodes.

FIG. 5 shows the conductors in the array of memory elements shown in FIG. 2, together with means for accessing the memory elements for the reading and writing of information. The return conductor busses 28 of FIG. 2 are row conductors in FIG. 5. The ingoing conductor terminals 24 in FIG. 2 are connected in FIG. 5 through a read diode $D_r$ to a corresponding read column conductor $C_r$, and through an oppositely-poled write diode $D_w$ to a corresponding write column conductor $C_w$. The two conductors $C_r$ and $C_w$ of a given column constitute a column conductor pair.

Each read conductor $C_r$ is connected through an impedance Z to the positive terminal + of a source of unidirectional potential, and is connectable through a switch RS to a point of reference potential such as circuit ground. Each write column conductor $C_w$ is connected through an impedance Z to the negative terminal — of a source of unidirectional potential, and is connectable through a switch WS to ground.

The return conductor bus terminals 29 of the row conductors 28 are connected to respective read-write drivers (not shown). A sense column conductor S is connected through sense diodes $D_s$ and through respective return conductor bus terminals 30 to respective return busses or row conductors 28.

The operation of the random-access array of memory elements of FIG. 5 will now be described. Any one of the nine memory elements illustrated may be accessed for reading and writing by acting on the conductors of one of the three column conductor pairs and by acting at the same time on one of the three row conductors. Normally, all of the read diodes $D_r$ are back biased by connections through respective column conductors $C_r$ and impedances Z to positive terminals + of a power supply. Similarly, all of the write diodes $D_w$ are back biased by connections through corresponding write column conductors $C_w$ and impedances Z to negative terminals — of a power supply.

It will be assumed that it is desired to access the upper, left-most memory element for the purpose of reading the information stored therein and later writing information into the accessed memory element. The read switch $RS_1$ is closed with the result that the corresponding read column conductor $C_r$ goes to ground potential, and takes the cathodes of all of the read diodes $D_r$ in the column to ground potential. This removes the back bias on the diodes $D_r$ in the column. Next, a positive read pulse R is applied from a driver to the row conductor $28_1$, which causes a current to flow through the conductive loop $23_1$, through the respective read diode $D_r$, through the column conductor $C_r$ and through the read switch $RS_1$ to ground. The other read diodes $D_r$ along the top row remain back biased and do not conduct. Therefore, a read current flows in the direction indicated through only the one selected memory element $23_1$.

If the memory element $23_1$ had a direction of remanent magnetic flux indicating the storage of a "0," for example, no flux is permanently switched by the read pulse R, and this fact is reflected by the absence of a signal on the column sense conductor S. On the other hand, if the memory element had a direction of remanent flux indicating the storage of a "1," the direction of the flux is switched by the read pulse R. The switching of flux is accompanied by the generation of a back voltage which opposes the current of the read pulse R that is causing the switching. This back voltage results in elevation of the potential of the entire row conductor 28 which, in turn, renders conductive the sense diode $D_s$ to which the row conductor is connected. Current then flows through the diode $D_s$ to the sense conductor S and is detected as representing a stored "1" by a sense amplifier (not shown) connected to the sense column conductor S.

The information sensing operation described requires that the read-write drivers (not shown) be constructed to have an appropriate output impedance. The drivers may consist of a voltage source together with a series output resistor. The resistor should have a value sufficiently large so that the potential of the row conductor can be different from the potential of the voltage drivers and can thus indicate the presence of a back voltage at a memory element.

After reading, read switch $RS_1$ is opened and information can be written back into the memory element $23_1$ by closing write switch $WS_1$ to ground, thereby removing the back bias on all of the write diodes $D_w$ of the respective column. Then, if it is desired to write a "1" in the memory element $23_1$, a negative write pulse $W_1$ is applied to row conductor $28_1$. This causes a current flow in the opposite direction through the memory element $23_1$, the respective write diode $D_w$ and the respective write column conductor $C_w$ from the grounded write switch $WS_1$. The write pulse flowing solely through memory element $23_1$, in the opposite direction compared with the preceding read pulse R, causes a switching of the direction of flux to a direction indicative of the storage of a "1."

On the other hand, if it is desired to store a "0" in the memory element $23_1$, a negative write pulse $W_1$ is not applied to the row conductor. In the absence of the write pulse $W_1$, the direction of flux in the memory element $23_1$ remains in the direction to which it was set previously by the read pulse R. This direction of flux indicates the storage of a "0" in the memory element. After a "1" or a "0" has been written into the memory element $23_1$ in the manner described, the write switch $WS_1$ is opened. All of the diodes $D_r$ and $D_w$ are then again back biased. The reading and writing of information can then be performed, in the same manner, with regard to another one of the memory elements 23.

The column conductors and diodes may be formed in a sheet array with contacts adapted for registered engagement with the contacts located on the top major surface 21 of the magnetic body 20 of FIG. 2.

The memory array is seen to be one wherein the selection of a desired one of the memory elements is accomplished with reliance on the non-linear characteristics of the diodes $D_r$ and $D_w$, rather than on the squareness of the hysteresis loop characteristic of the magnetic material surrounding the loop conductors of each memory element. It is not necessary to use a magnetic material having a square loop characteristic. However, the use of a magnetic material having a relatively square loop characteristic is desirable because the more nearly the hysteresis loop characteristic approaches a square characteristic, the smaller is the amount of undesirable nonreversing or "elastic" flux switching which occurs as the result of the high amplitude current pulses needed to make the switching as rapid as possible. The minimization of elastic flux switching, due to the use of relatively "square" magnetic material, minimizes the unwanted noise generated during the reading of a stored "0." There is consequently an improvement in the "1" to "0" (noise) ratio.

A number of similar planar arrays, such as the one shown in FIG. 3, may be arranged in a stack (not shown). The number of planar arrays in the stack is made equal to the desired number of information bits in each information word to be handled as a unit at one time. The read drivers and read switches may be common to all the planar arrays. An individual sense conductor S and sense amplifier is provided for each planar array. For writing, either the write drivers are common to all planar arrays and the write switches are individual, or vice versa.

Such a memory stack needs only the relatively simple decoders of a X-Y coincident-current memory. The additional decoding such as is needed for word-organized memories is inherent in the memory itself. The use of two diodes per memory element, in the arrangement of FIG. 3, largely avoids the pulse amplitude limitation, and resulting speed limitation, or prior X-Y coincident current memories, while retaining the advantage of needing only relatively simple decoders.

What is claimed is:

1. In an array of information storage locations,
 a body of magnetic material,
 a plurality of conductors imbedded in said magnetic body in a first transverse plane, each of said conductors extending from a terminal end on one surface of said magnetic body to the opposite surface,
 an equal plurality of return conductors imbedded in said magnetic body in a second transverse plane closely parallel to said first plane, each of said return conductors having a connection with a respective conductor over said opposite surface and extending parallel with the respective conductor to an end within said magnetic body near said one surface,
 a bus conductor within said magnetic body connecting said ends of said return conductors and having a terminal on said one surface, and
 means selectively to apply currents to said conductors to cause flux-switching magnetomotive forces, due to the current flowing in opposite directions through the conductor and associated return conductor, which are additive in the magnetic material between the conductor and return conductor and subtractive elsewhere.

2. An array of information storage locations,
 a body of magnetic material,
 a plurality of conductors imbedded in said magnetic body in each of a plurality of parallel transverse planes, each of said conductors extending from a terminal end on one surface of said magnetic body to the opposite surface,
 an equal plurality of return conductors imbedded in said magnetic body in transverse planes each closely-spaced parallel with one of said first-named transverse planes, each of said return conductors having a connection with a respective conductor over said opposite surface and extending parallel with the respective conductor to an end within said magnetic body near said one surface,
 a plurality of bus conductors within said magnetic body each connecting said ends of return conductors in a plane and having a terminal on said one surface, and
 means selectively to apply currents to said conductors to cause flux-switching magnetomotive forces, due to the current flowing in opposite directions through the conductor and associated return conductor, which are additive in the magnetic material between the conductor and return conductor and subtractive elsewhere.

3. The combination of
 a planar body of magnetic material having information storage locations arranged therein in rows and columns,
 each said information storage location including a conductor imbedded in said magnetic body and extending from a terminal end on one surface of said planar magnetic body to the opposite surface, a connection on said opposite surface, and a closely-spaced parallel return conductor extending through said magnetic body to an end within said magnetic body near said one surface,
 a plurality of row bus conductors within said magnetic body each connecting the imbedded ends of return conductors of a corresponding row and each having a terminal on said one surface,
 a pair of oppositely-poled diodes for each information storage location, both said diodes of a pair being connected to the terminal end of the conductor of the respective information storage location on said on said one surface of said magnetic body, and a pair of column selection conductors for each column of information storage locations, each conductor of a column selection conductor pair being connected to respective diodes of diode pairs along the corresponding column of information storage locations.

References Cited

UNITED STATES PATENTS 3,229,266 1/1966 Rajchman ---------- 340—174

FOREIGN PATENTS 858,762 1/1961 Great Britain.

BERNARD KONICK, *Primary Examiner.*

JAMES W. MOFFITT, *Examiner.*

R. MORGANSTERN, *Assistant Examiner.*